United States Patent Office 3,243,473
Patented Mar. 29, 1966

3,243,473
POLYMERIZATION OF OLEFINS USING A GALLIUM TRICHLORIDE - SILICA - ALUMINA CATALYST
Robert M. Engelbrecht, St. Louis, and Joseph Q. Snyder, St. Charles, Mo., assignors to Monsanto Company, a corporation of Delaware
No Drawing. Filed Dec. 26, 1962, Ser. No. 247,287
8 Claims. (Cl. 260—683.15)

This application is a continuation-in-part of application Serial No. 821,688, filed June 22, 1959, and now abandoned.

This invention relates to a catalyst comprising a silica-alumina impregnated with a minor amount of a gallium halide and to a process for polymerizing olefins in the presence of this catalyst.

It is an object of this invention to provide an improved catalyst having particular utility in the polymerization of olefins. It is also an object of this invention to provide an improved process for the polymerization of olefins. Additional objects will become apparent from the description of this invention.

The novel catalyst of this invention is prepared by impregnating a silica-alumina with a minor amount of an inorganic gallium halide, such as a gallium chloride, gallium bromide, gallium iodide or gallium fluoride. Gallium tri-halides, i.e., gallium trichloride, are used to prepare particularly preferred catalysts of this invention. While catalysts comprising a silica-alumina and any minor amount of a gallium halide are encompassed by this invention, those catalysts containing from 0.05 to 10% by weight of total composition of the gallium halide are extremely useful and those compositions containing from 0.1 to 5% by weight of total composition of the gallium halide are particularly preferred. The following example is a specific illustration of a manner in which the novel catalysts of this invention can be prepared:

*Example 1*

Approximately 46 grams of pelleted silica-alumina (87.3% $SiO_2$ by weight and 12.4% $Al_2O_3$ by weight) were placed in a steel bomb. To the bomb was added 0.5 gram of gallium trichloride. The bomb was closed and heated to a temperature of 190° C. for 18 hours. The resultant catalyst contained approximately 0.25% by weight of total composition of gallium trichloride.

The catalysts of this invention can be used as hydrogenation catalysts and as isomerization catalysts. However, they are particularly useful as catalysts for the polymerization of olefins. This is illustrated in the following example:

*Example II*

A suitable reactor was charged with the catalyst prepared in Example I. A propylene-containing hydrocarbon stream (about 75 weight percent propylene with the balance being primarily propane and other paraffins) was passed through the catalyst bed. Reaction pressure was maintained at about 1000 p.s.i.g. max. and the reaction temperature was maintained in the range from 139° C.– 149° C. The space velocity was approximately 0.2 gram of propylene per gram of catalyst per hour. The liquid reaction product from the reactor was recovered and separated by fractional distillation into its various polymeric components. An 87% conversion of propylene to liquid products was obtained having the following composition:

| | Percent |
|---|---|
| $C_6$ olefins | 1.7 |
| $C_9$ olefins | 23.8 |
| $C_{12}$ olefins | 25.9 |
| $C_{15}$ olefins | 24.0 |
| Higher olefins | 25.7 |

As a comparative evaluation of the improved performance characteristics of the novel catalysts of this invention, the procedure set forth in Example II was repeated with the exception that the catalyst was the unpromoted silica-alumina pellets used to prepare the catalyst employed in Example II. Reaction conditions were substantially the same. In this case only a 60 to 75% yield of liquid products was obtained.

Any convenient method well known to those skilled in the art can be used to prepare the novel catalysts of this invention. The technique employed to impregnate silica-alumina with gallium halide in accordance with this invention is not a critical feature. Any silica-alumina support can be used to prepare the compositions of this invention. Preferably, the silica-alumina support for the novel catalysts of this invention contain predominately silica as a base constituent which is preferably in the range of 50 to 99% by weight of the support. The alumina content preferably ranges from 1 to 50 weight percent. A silica-alumina base of any range of these components is operable in the invention.

Polymerization reactions utilizing the novel catalysts of this invention can be performed with a wide variety of polymerizable olefins, such as the type which are to be found in refinery gases. The catalyst of this invention is particularly well suited to the polymerization of olefins containing from 2 to 6 carbon atoms, as for example, propylene, ethylene, butylene, pentenes and hexenes. Olefins of high molecular weight can also be polymerized utilizing the novel catalyst of this invention. The polymerization reaction can be carried out over a rather wide temperature range. Generally, it is carried out at an elevated temperature. Temperatures in the range of from about 50° C. to about 150° C. are particularly useful although much higher temperatures can be used if desired. According to the process of this invention, polymerizations are best carried out in the liquid phase, although they can be carried out in the vapor phase if desired. The reaction is generally carried out at superatmospheric pressures. Pressures from about 500 p.s.i.g. to 2000 p.s.i.g. are particularly useful and much higher pressures can be used if desired. It is generally desired that the polymerization reaction be carried out in the presence of an inert diluent. Normal paraffins and cyclo paraffins are particularly preferred as inert diluents. Generally, the olefin containing hydrocarbon feed stream contains from about 20% to about 90% by weight of the polymerizable olefin. In the polymerization, the liquid space velocity of the polymerizable olefin can be substantially varied. Space velocities of the order of 0.3 gram of olefin per gram of catalyst per hour have been found particularly useful. At times, space velocities as low as 0.05 and as high as 2.0 can be used if desired.

The gallium halides useful in the catalysts of the present invention are the inorganic gallium chlorides, gallium bromides, gallium iodides and gallium fluorides. These include both the di- and tri-halides of gallium. The gallium halide particularly preferred in the practice of the present invention is gallium trichloride.

What is claimed is:

1. A process for polymerizing olefin hydrocarbons which comprises contacting a hydrocarbon feed containing olefin hydrocarbons of 2 to 6 carbon atoms at a temperature of 50 to 150° C. and a pressure of 500 to 2,000 p.s.i.g. with a catalyst consisting essentially of a silica-alumina support containing from about 0.05 to 10 percent by weight of the total composition of gallium trichloride.

2. The process of claim 1 wherein the olefin is propylene.

3. The process of claim 1 wherein the hydrocarbon feed contains said olefin hydrocarbons of 2 to 6 carbon atoms in an amount ranging from 20 to about 90 percent by weight of said feed.

4. The process of claim 1 wherein the catalyst contains 0.1 to 5 percent by weight of the total composition of gallium trichloride.

5. The process of claim 1 wherein the silica-alumina support is one containing 50 to 99 percent by weight of $SiO_2$ and 1 to 50 percent by weight $Al_2O_3$.

6. A process for polymerizing olefin hydrocarbons which comprises contacting a hydrocarbon feed containing olefin hydrocarbons of 2 to 6 carbon atoms at a temperature of 50 to 150° C. and a pressure of 500 to 2,000 p.s.i.g. with a catalyst consisting essentially of a silica-alumina support and from 0.1 to 5 percent by weight of the total composition of gallium trichloride, said silica-alumina support containing 50 to 99 percent by weight $SiO_2$ and 1 to 50 percent by weight $Al_2O_3$.

7. The process of claim 6 wherein the olefin is propylene.

8. The process of claim 6 wherein the hydrocarbon feed contains said olefin hydrocarbons of 2 to 6 carbon atoms in an amount ranging from 20 to about 90 percent by weight of said feed.

References Cited by the Examiner

UNITED STATES PATENTS

| 2,522,687 | 9/1950 | Padgitt et al. | 260—683 |
| 2,657,245 | 10/1953 | Davidson | 260—683 |
| 2,827,447 | 3/1958 | Nowlin et al. | 260—683 |
| 2,935,542 | 5/1960 | Minckler et al. | 260—683 |

OTHER REFERENCES

Schildknecht: "Vinyl and Related Polymers," published by Wiley & Sons, New York (1952), p. 541 relied on.

PAUL M. COUGHLAN, *Primary Examiner.*

ALPHONSO D. SULLIVAN, *Examiner.*